United States Patent [19]

Heynatz

[11] Patent Number: 4,796,840
[45] Date of Patent: Jan. 10, 1989

[54] TRAILING EDGE FLAP OPERATION IN WINGS

[75] Inventor: Johann T. Heynatz, Immenstaad, Fed. Rep. of Germany

[73] Assignee: Dornier GmbH, Fridrichshafen, Fed. Rep. of Germany

[21] Appl. No.: 76,307

[22] Filed: Jul. 22, 1987

[30] Foreign Application Priority Data

Jul. 22, 1986 [DE] Fed. Rep. of Germany ....... 3624675

[51] Int. Cl.$^4$ .................................................. B64C 9/18
[52] U.S. Cl. ..................................... 244/215; 241/213; 241/217
[58] Field of Search ............... 244/214, 215, 216, 217, 244/218

[56] References Cited

U.S. PATENT DOCUMENTS

| | | | |
|---|---|---|---|
| 2,591,000 | 4/1952 | O'Brien | 244/216 |
| 2,688,455 | 9/1954 | Clark | 244/216 |
| 3,977,630 | 8/1976 | Lewis et al. | 244/216 |
| 4,172,575 | 10/1979 | Cole | 244/216 |
| 4,434,959 | 3/1984 | Rudolph | 244/215 |
| 4,444,368 | 4/1984 | Andrews | 244/216 |

Primary Examiner—Galen Barefoot
Assistant Examiner—L. M. Fiorito
Attorney, Agent, or Firm—Ralf H. Siegemund

[57] ABSTRACT

Flap carriers fold spanwise (about chordwise axes) into the wing but are moved down together through pivotal linkage; the flaps are protracted and retracted through pivoting of the carriers relative to each other on spanwise axes. On retraction, the entire assembly fits into the wing so that the flow determining contour thereof remains undisturbed.

7 Claims, 3 Drawing Sheets

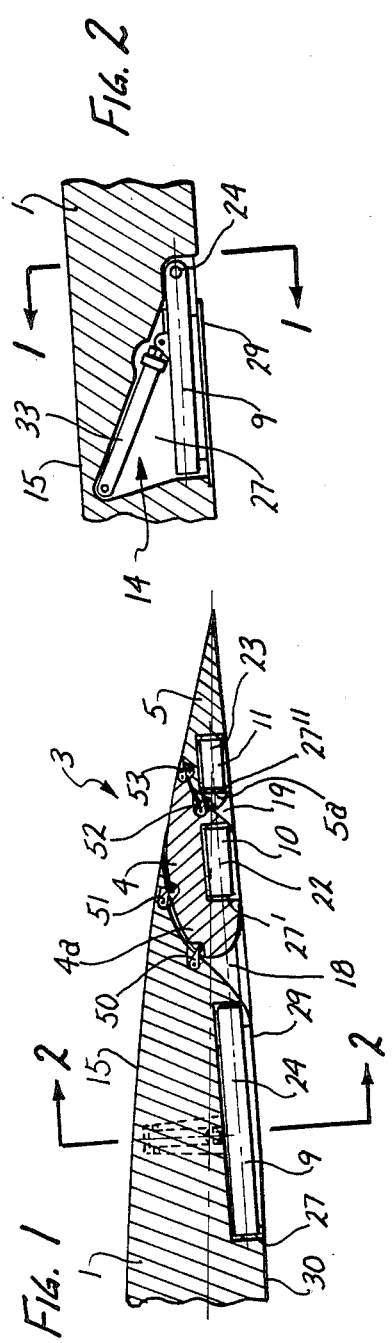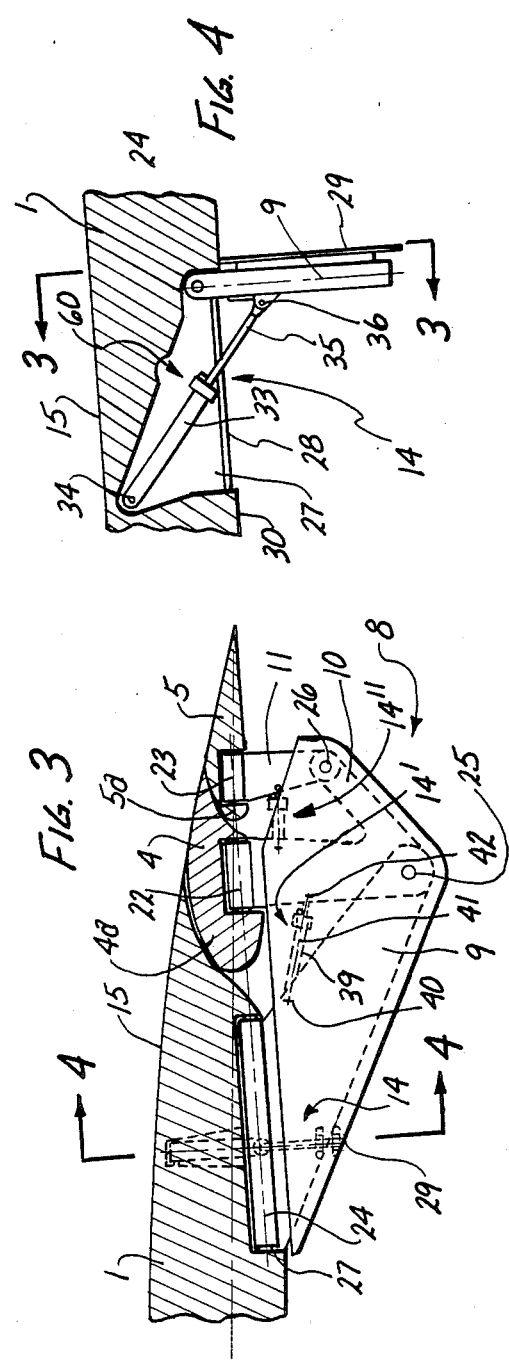

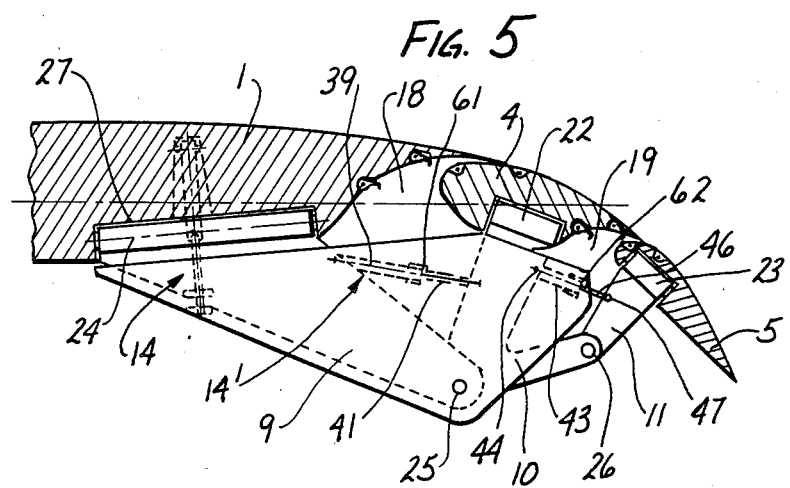
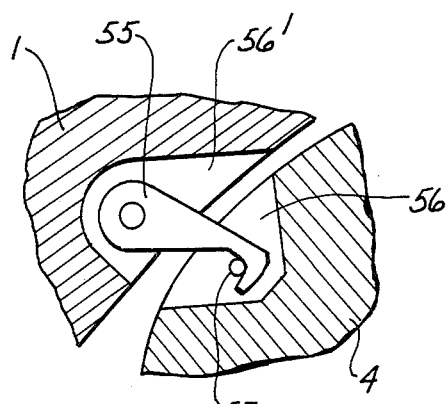

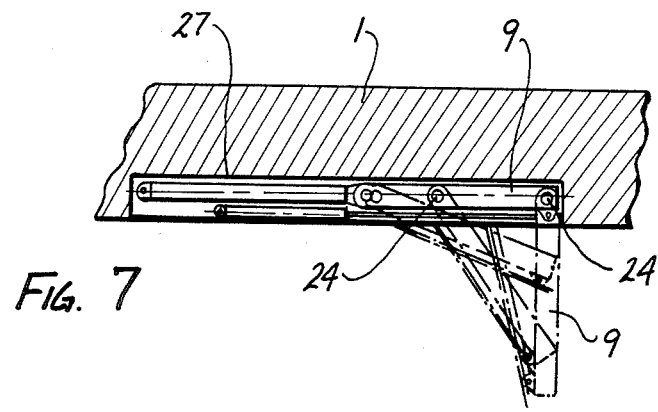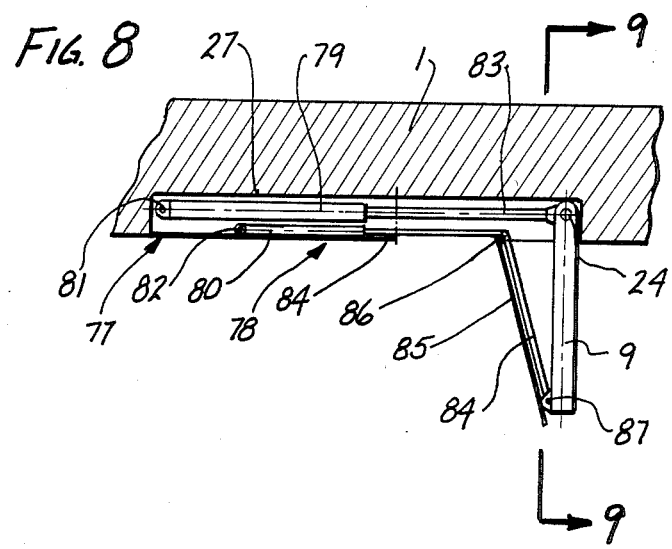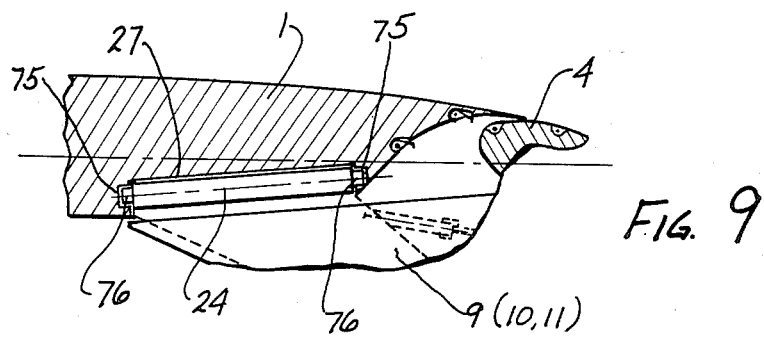

4,796,840

TRAILING EDGE FLAP OPERATION IN WINGS

BACKGROUND OF THE INVENTION

The present invention relates to the adjustment of flaps, particularly high lift flaps, as provided on and for wings of aircraft.

More particularly, the invention relates to the adjustment of such flaps or flap systems arranged along the trailing edge of the wing, under utilization of carrier and boom arms, levers, linkages, drives, gears, transmission devices, pivotable devices, as well as devices for receiving and holding flaps, as well as the flap adjusting structure.

Flaps, or flap systems, are used on the wings of aircraft for the control of the lift, and here particularly for lowering the minimum speed during landing. The flaps will be protracted from a retracted position under utilization of a suitable kinematically operating mechanics, for purposes of increasing the effective lift area. In the retracted position, the flaps are, in fact, as far as the wing's contour is concerned, a part of that wing contour and will be as unobtrusive as possible, particularly as far as that erodynamically configured contour is concerned. The flaps of the system are simultaneously or separately moved in that they are caused to run along a curved path, and down to thereby increase the circulation of air flow around the wing.

Known devices for flap adjustment are configured to have, in fact, a curved track as seen in the direction of the chord depth of the wing. These tracks may include guide rails which are protracted or retracted, and held in certain carriage or slide structures carrying the flaps, while moving on these rails. In addition to crosswise retraction and protraction, the flaps permit pivoting on axes parallel to the span of the wing. Other known devices for flap adjustment include carrier arms; the high lift flaps are mounted on these carrier arms. Together, carrier arms and flaps can be protracted and pivoted down, under utilization of a particular track, and vis-a-vis the remainder of the wing.

In order to obtain flap pivot radii, which at one end permit a predictable flow pattern, that is a favorably flow pattern in all pivot positions and in relation to the wing, and which, on the other hand, permit a highly effective lift increase area, the carrier arms for the flaps will have to have fairly long length extensions. This then poses a problem in that the carriers, once retracted, cannot completely be accommodated within the aerodynamic contour of the wing. Rather, these carriers may project from the underside of the wing. This, of course, entails certain drag, and to minimize the drag, one needs to have a cover for the projecting carrier arms portions.

Lever linkages for pivoting such flaps are known which do, in fact, lie inside the contour of the wing when retracted. But these linkages and transmissions are quite extensive and complicated, and, in fact, it was found that owing to the space requirements, this kind of an arrangement can be used only when the wing is relatively thick.

DESCRIPTION OF THE INVENTION

It is an object of the present invention to provide a new and improved flap pivoting structure which, in the retracted position, i.e. during regular cruising, does not extend in any manner, or to a very minor extent and as far as the flap adjusting mechanism is concerned, over and beyond an erodymanic wing profile, particularly at the underside of the wing.

It is a specific object of the present invention, to provide a device and arrangement for flap adjustment, particularly high lift flaps of flaps systems along the trailing edge of an aircraft wing, under utilization of linkages and carrier elements, and in a manner which accommodates the mechanism within the confines of the wing, particularly in the retracted position during cruising.

In accordance with the preferred embodiment of the present invention, it is suggested to provide flap carriers which are folded about chordwise extending axes to extend spanwise when folded into recesses in the wing, while the pivot shaft undergoes a combined transverse sliding and pivot motion for folding the carrier down. One main carrier is thus pivoted on the wing and carries, through pivotability on a spanwise axis, another carrier which in turn is pivoted on a chordwise axis (with transverse shift of its pivot shaft) to the first carrier and to a flap and so forth. Through actuation the entire carrier assembly is folded into and out of the wing, and through further actuation the flap carrying carrier is pivoted on the main carrier. The chordwise pivot axes are coaxial in relation to each other whenever the flaps are retracted. The carriers, together with a flap adjusting device, are pivotably linked in a manner which reduces air resistance on the wings.

DESCRIPTION OF THE DRAWINGS

While the specification concludes with claims particularly pointing out and distinctly claiming the subject matter which is regarded as the invention, it is believed that the invention, the objects, and features of the invention, and further objects, features, and advantages thereof will be better understood from the following description taken in connection with the accompanying drawings in which:

FIG. 1 is a cross-section through a trailing edge portion of an aircraft wing, illustrating also a landing flap system, in a schematic section, the section view and plane is indicated by the line I—I in FIG. 2;

FIG. 2 is a section view, taken along lines II—II in FIG. 1, covering a portion of the wing and showing a main flap carrier in conjunction with a carrier adjusting mechanism in the retracted or folded back position;

FIG. 3 is a view similar to FIG. 1, but showing the flap carrier in a deployed or protracted position, the section of FIG. 3 being taken along lines III—III in FIG. 4;

FIG. 4 is a section view taken along lines IV—IV in FIG. 3, and analogously differing from FIG. 2 in that the flap carrier is shown folded down;

FIG. 5 is still a similar view as FIGS. 1 and 3, but now showing a completely protracted flap system;

FIG. 6 illustrates a detail, particularly for fastening the flap carriers and the high lift flaps in particular positions;

FIGS. 7 and 8 are section views of portions in an aircraft wing, but now showing a different embodiment, whereby FIG. 7 illustrates the retracted, and FIG. 8 the protracted flap carrier position; and FIG. 9 is a view, taken along lines IX—IX in FIG. 8, showing details of the guide structure thereof.

Proceeding now to the detailed description of the drawings, FIGS. 1 through 5 show a wing 1 with a flap system which includes a forwardmost flap or slat, which is not shown, but there is also a rear or trailing edge flap system 3 including the flaps 4 and 5. The wing 1 includes (i.e. houses) flap carrier or flap carrier assemblies each of which includes a main carrier 9, a first carrier element 10, and a second carrier element 11. Adjustable and adjusting devices 14, 14' and 14" are, respectively, associated with and connected to the flap carriers 9, 10 and 11. In fact, the adjusting devices 14' and 14" link the carriers 9, 10 and 11 together for operation referencing to carrier 9. The device 14 provides for folding of carriers 9, 10, 11 together as these carriers are interconnected in pairs through pivots 25, 26. These adjusting devices 14, etc., are either pivot operated, i.e. at will, or in an automated fashion, or there is a combination of both.

Basically, the flaps 4 and 5 are arranged in a manner known per se, such that in a retracted position they establish a flush contour with and surface continuation of the wing 1. In other words, they do not provide any aerodynamic obstacle when retracted. Specifically, for this purpose, the first flap 4 has a particularly contoured nose 4a and this nose is received matchingly or matingly contoured recesses 18 in the rear or trailing area of wing 1. Analogously, a nose portion 5a of the second flap 5 is received in a correspondingly contoured recesses 19 of and in the trailing portion of the first flap 4. Reference numerals 15 and 30, respectively, refer to the upper and underside of the wing.

Flaps 4 and 5 receive or are held by flap carriers 10 and 11, respectively, in that these flap carriers are pivotable vis-a-vis the respectively associated flaps, pivoting to occur around axes 22 and 23, respectively. Thus, main carrier 9 pivots an axis 24 with shaft journalled in wing 1, carrier 10 pivots on axis 22 with a shaft journalled in flap 4, while carrier 11 pivots on an axis 23 with a shaft journalled in flap 5. All the axes run in wing chord direction of the wing 1, and are co-axial whenever the flaps are retracted. The first and second flap carriers 10 and 11 are held by carrier parts 9 (carrier 11 indirectly through carrier 10) which parts are pivotably mounted in the wing 1 through the shafts 24 as stated. In the retracted position, as shown in FIGS. 1, 2, 3, and 4 of all the flap, the shaft 24 is also coaxial with the axis 22 and 23 of the flaps 4 and 5, respectively.

Carrier parts 9 when deployed (folded down), link to carrier 10 by the pivot axis 25 having an orientation transverse to the chord depth, that means in the direction of the wing span. Carrier 10 thus holds pivotably flap 4 through first flap carrier 10. Analogously, the flap carrier 10, on its part holds the second flap carrier 11 through pivot axis 26 also having a position transverse to the chord depth.

Indents, recesses or pockets 27, 27', 27" are formed in the underside 30 of the wing. They serve to receive the flap carriers 9, 10, and 11, when folded in. The indents, recesses or pockets 27 etc. correspond to the outer contour of the flap carriers in a complementary matching or mating relationship so that, when all the carriers are folded in, the flow around the wing is not disturbed by these carriers. In order to avoid interference with the flow through the indents 27, 27', and 27" for the respective flap carriers, and to reduce any interference to the utmost extent possible, solid flaps covers 29 are provided on the main carrier 9, the cover flaps 29 provide closure of the openings 28 of pockets 27, 27', 27". The flap covers 29, in fact, establish the skin of the wing, particularly of the underside 30 in the area of the recesses, pockets or indents 27, 27', and 27".

In order to provide deployment and fold back movements of the carriers 9, 10, and 11 around their respective axes 22, 23, and 24, adjusting device 14 is provided, as already mentioned. These devices, for example, are established by hydraulic operating adjusting i.e. piston-cylinder drives or devices. They each include first a working cylinder 33 which bears, by means of a hinge or articulated joint 34, against the structure or better, infrastructure of the wing 1. The respectively associated piston 35 is hinged or pivotably linked by means of joint 36 to the carrier 9. Here then, the device 14 is positioned in a vertical plane transverse to a vertical section plane of the wing structure.

The devices 14, 14', etc. provided for folding and pivoting of carriers 9, 10, and 11, are also disposed within the recesses 27 of the wing 1. The respectively associated pressure medium control for the devices 14 are conventional and have been omitted for sake of clarity; they operate in conjunction with a pressurizer. Devices 14' and 14" are provided for pivoting in and out, i.e. retracting and protracting. The flaps 4 and 5, while respectively for that purpose, pivot around the axes 25 and 26, and by means of the respectively associated holding flap carriers 10 and 11, the pivoting is a bi-directional one in direction and in plane of the chord depths. The axes 25 and 26 of flap pivoting, i.e. protracting and retracting extend transversely to the plane of the drawings of FIGS. 1, 3 and 5.

The devices 14' and 14" also operate hydraulically. The respectively associated pressure medium control is also omitted for sake of clarity, and is deemed to be conventional. Each device 14' has a working cylinder 39 articulated by means of a hinge 40 to the carrier 9. Each device and drive 14' has also a working and operating piston 41 and through an articulated joint 42, the piston is connected to the first flap carrier 10. Analogously, the adjusting device 14" includes a working cylinder 43 and by means of hinges or joints 44, this cylinder is connected to the first flap carrier 10. Each device 14" includes also a working piston 46 and a hinge joint 47 connects the piston to the second flap carrier 11.

The device as described operates as follows. For protraction of flaps one first begins from the folded in or retracted position as shown in FIGS. 1 and 2. In the first phase carrier parts 9 are folded out and down into a deployment or flap pivoting plane, which is vertical, transverse to the wing along the chord. Folding down involves specifically also the flap carriers 10 and 11, which follow the folding out of carrier 9. The folding out position is caused and effected by the adjusting device 14. The adjusting piston 35, bearing against the wing 1, is operated through fluid control in the respective cylinder 33 and thereby adjusts i.e. folds down the carrier 9. When completely folded out and down the adjusting device 14 mechanically locks through suitable latches.

In the second phase of flap operation, flaps 4 and 5, either in unison or separate from each other depending on the aerodynamic and flight requirements are pivoted around the axes 25 and 26, by means of the flap carriers 10 and 11. These operations are carried out by the adjusting devices 14' and 14", respectively, which can, as stated, operate together or individually. The position change attained here is from the position shown in FIGS. 3 and 4 to the position in FIG. 5 whereby carrier 10 pivots on carrier 9 and carrier 11 pivots on carrier 10. The adjusting piston 41 of adjusting device 14', bears against carrier 10 while the adjusting cylinder 39 of device 14', bears against flap carrier 9. This way flap 4 is pivoted; cylinder 43 of drive 14" bears against carrier 10 and piston 46 links at 47 to the carrier 11 which pivots flap 5 around axis 26. The pivoting may occur separately, as stated, or in unison and a position is obtained as shown in FIG. 5.

The adjusting devices 14' and 14" are also subject to locking, when the adjustment has been completed in order to maintain the locked position independent from the hydraulics. For this latch and locking devices 50, 51, 52, and 53 are provided for locking the flaps 4 to the aircraft wing 1 in order to render their position independent from the adjustment. Analogously, the flaps 5 are locked to the flaps 4 in the inserted or retracted position, as far as the carriers 9, 10, and 11 are concerned. Further locking is provided for as far as the adjusting devices 14, 14', and 14" are concerned.

The locking devices 50, 51, 52, and 53 included in this particular example (FIG. 6) include pivotable hooks 55, which are connected either to the wing 1 or to the flaps 4, for selective engagement or disengagement in indents such as 56 and 56', there being abutment pins 57 at the flaps 4 and 5, respectively around which the respective hook can grip. The latching devices 50, 51, on one hand, and 52, 53, on the other hand, respectively, for the flaps 4 and 5, should be arranged next to the indents 27, 27' and 27", for favorable accommodation, whereby the term next is seen in span direction of wing 1 or flaps 3. In addition, adjusting devices (not shown) are provided by means of which the various phases of flap protraction, as well as the reverse movement is automated in order to ensure the proper sequence of operation and movement, whereby then there is a mutual dependency of control exactly for the purpose of ensuring this sequencing.

Proceeding now to the second embodiment, as shown in FIGS. 7, 8, and 9, there are also flap carriers 9, 10, and 11, accommodated in recesses 27, 27', and 27" in the wing 1, and in the flaps 4 and 5 respectively. While the embodiment of FIGS. 1–6 shows the flap carriers to be strictly pivotable, the present example uses a combined slide and pivot motion for carrier fold down; the carriers are retracted such that the shafts 24, 23, and 22 extending coaxially and in chord direction are shifted transversely i.e. in direction of the wing span. The slide and pivot motion obtains by means of appropriate guide means such that the flap carriers 9, 10, and 11 follow a cylindrical path, upon insertion into and being moved out of the recesses 27, 27', and 27" in the wing 1, the flap 4 and the flap 5, respectively. For this guide rails with grooves 75 are placed to both sides of the recesses 27, 27', and 27", respectively, in the wing 1, the flap 4, and the flap 5. They face each other as to each particular recess. These guide rails 75 extend in span direction and run parallel to each other as well as to the direction of span and flap. Guide pins 76 extend coaxially from the end shafts 24, 23, and 22 respectively and run in these rails 75 in order to shift these shafts transverse to their axes.

In order to shift these shafts 24, 22, and 23, respectively, of the carrier arms 9, 10, and 11, pairs of adjusting devices 77 and 78 are provided which are positioned also inside of the indents 27, 27', and 27" whenever respective flap carriers 9, 10, and 11 are in the folded in position. The cylinder-piston adjusting devices 77 are pivotably connected such that the respective cylinders 79 (there are three, only one is shown in FIG. 8), are linked through pivot axes 81 to the wings 1, the flaps 4, and the flaps 5, respectively, while the respective pistons are linked to carriers 9, 10 and 11 through pivots. Pivoting obtains in a vertical plane. The pistons 83 act upon the upper end of the flap carriers 9, 10, and 11, as the case may be, and are articulated or pivoted to these parts in the vicinity of the axes 24, 23, and 22.

Respective associated adjusting devices 78 each have a piston 84 connecting through an articulated linkage 86 to a guide rod 85, which rod has its other end articulated (joint 87) to the lower end of the respective flap carrier 9 (or 10, or 11) as the case may be. The other end of rod 85 is linked to the respective piston rod through the hinge or articulated joints 86. The cylinders 80 of these drives are hinged or pivoted to the wing 1 (or flap 4 or flap 5) at pivot 82). The recesses or pockets 27, 27', and 27" are also here covered by means of cover flaps (not shown, similar to 28) which, in this case, are secured to the guide rods 85.

All of the adjusting devices 77, 78 for the carriers 9, 10, and 11, respectively, and for the flaps 4 and 5, should be duplicated and arranged to both sides (chordwise) of the respective carriers in order to avoid skewing in the adjustment operation.

In the retracted position of the flap carrier 9, 10, and 11, as the case may be, these flap covers cover completely the opening of the respective pockets or recesses 27, 27', and 27". The control particulars for the adjusting devices 77 and 78 are for conventional design and configuration, and operation is omitted for the sake of clarity.

The device as illustrated in this particular embodiment operates as follows. For retracting flap carriers 9, 10, and 11, adjusting device 77 is operated which, in turn, moves (pulls) the adjusting piston 83 to obtain retraction. This way then, flap axis 24, 23, and 22 will be adjusted transversely to themselves in the direction of the longitudinal axis of the adjusting device 77. This means, the adjustment obtains in the span width of the wing and flap 4, 5, as the case may be, and this adjustment obtains in parallel. The guide of the flap shafts along a straight line obtains by means of the guide grooves 75 accommodating the pins 76, running in these grooves; these pins extend from the shafts 24, 23, and 22, as was outlined above.

Concurrently thereto, and dependent upon the adjustment of the piston 83 of device 77, the device 78 moves also the piston 84 for purposes of obtaining a retraction movement. The other end of the flap carriers 9, 10, and 11, are thus vertically adjusted vis-a-vis the wing 1 through a straight line guidance under utilization of the articulated joints 86 and 87. The adjustment obtains by means of the guide rod 85 linked to piston rod 84. The common adjusting movement of the devices 77 and 78' cause flap carriers 9, 10, and 11 to move on a circular cylindrical path forwards their respective retractive position within the indents and recesses 27, 27', and 27", so that all parts of the adjusting devices, as well as the flap carriers 9, 10, and 11 are accommodated flush within the recesses and indents 27, 27' and 27".

Now, for purposes of protraction, particularly of the flap carries, operation obtains in the reverse. Flap carriers 9, 10, and 11, moreover, can be used otherwise, namely for purposes of increasing the lift. Here then a camberline change of the wing obtains through flap operation, and the superimposed adjustment upon the flaps 4 and 5 change the camberline. This adjustment obtains in the direction of chord depth and in relation to each other. Here then, these flaps are operated as Fowler flaps. This additional use does not interfere at all with the inventive configuration.

Recesses and pockets 27, 27', and 27" are also here covered by means of flaps 29 and 88 in order to match the open area of these recesses to the required flow contour along the wing. They maintain surface conditions favorable for the flow of air around the wing. Moreover, these indents should be matched to the carrier periphery. This way, the surface portions of the carriers 9, 10, and 11 facing the flow, on one hand, and having transition portions to the underside 15' of the wing, on the other hand, provide closure which are favorable as far as flow conditions are concerned. This aspect is not shown in detail.

The elements 75, 76, 79, and 80 provide for straight guidance of the carriers 9, 10, and 11 in this particular embodiment shown in FIGS. 7, 8 and 9. This straight guiding permits folding in and out of the carrier 9, 10, and 11, with minimum width of any air passage way on the underside 15' of the wing. Analogously, for folding in and out of the carriers 10 and 11, locking structures for the flaps 4 and 5 in the retractive position are provided for as was described earlier.

The invention is not limited to the embodiments described above, but all changes and modifications thereof, not constituting departures from the spirit and scope of the invention, are intended to be included.

I claim:

1. Flap arrangement with adjustment devices along the trailing edge of an aircraft wing, having a plurality of wing flaps, comprising:
    a first flap carrier, pivotably mounted to the wing, on shaft means which extend in chord direction of the wing, said shaft means being slidably mounted in a recess on the underside of the wing, for sliding in spanwise direction, said first carrier thus being provided for pivoting and down extension as well as sliding, in and retraction into the recess in the wing, while undergoing a combined sliding and pivot motion for down extension, the carrier will extend in spanwise direction when folded into the recess;
    a plurality of further carriers including a second carrier being hinged to said first carrier through a first, spanwise pivot axis when the first carrier is pivoted out of the recess, and a third carrier pivoted to the second carrier by a second pivot axis extending spanwise when the second and third carrier extend down, the plurality of further carriers being respectively pivoted to further chordwise axes on said wing flaps such that when all said wing flaps are in a retracted position the latter chordwise pivot axes are coaxial with said first pivot axis;
    means for pivoting the further carriers about the spanwise pivot axes for protraction and retraction of the wing flaps;
    said wing flaps having recesses, said further chordwise axes being established by additional shafts, respectively, sliding in the latter recesses; and
    the first carrier, when situated in the recess of the wing, causing the wing to offer minimal drag as all of the carriers are now within aerodynamic confines of the wing plus wing flap configuration.

2. Device and arrangement as in claim 1, wherein for guiding of the respective carrier, piston cylinder drives act on the carrier near the respective chordwise pivot axis as well as at an opposite end of the respective carrier.

3. Device and arrangement as in claim 1, there being cover means for covering the recesses when the carriers are retracted.

4. Device for positioning and adjusting a trailing edge flap in an aircraft wing, comprising:
    a first carrier mounted on a first shaft for pivoting on a chordwise axis, there being a recess in the underside of the wing into which the first carrier can be folded and from which it can be folded down to extend substantially vertically, said first shaft being slidably disposed in the recess, for sliding in the recess transversely to the axis;
    a second carrier on a second shaft, the second shaft being slidably disposed in a second recess, being in the flap, for sliding transversely to said axis and pivoting on another chordwise axis, said second carrier additionally being pivoted to the first carrier for pivoting above a spanwise axis on the first carrier thereby protracting and retracting the flap, the recess in the flap receiving the second carrier when folded back upon pivoting the second carrier on the other chordwise axis;
    first operating means linked to the first carrier for obtaining said transversed sliding and folding of the first carrier whereby the second carrier follows the folding of the first carrier, including folding of the second carrier to extend down; and
    second operating means connected to the first and second carrier for pivoting the latter relative to the former on said spanwise axis, including pivoting and sliding the second shaft in the second recess, thereby protracting and retracting as well as pivoting said flap.

5. Device as in claim 4, said chordwise axis of pivoting the second carrier being coaxial with the chordwise pivot axis of the first carrier when the second carrier has swung the flap into a completed retracted position.

6. Device as in claim 4 including cover means for covering the carriers when folded back into the respective recesses.

7. Device as in claim 4 including locking means for at least one of the carriers to hold it in the folded down position.

* * * * *